United States Patent
Penrod et al.

(10) Patent No.: US 12,244,887 B2
(45) Date of Patent: Mar. 4, 2025

(54) SYSTEMS AND METHODS FOR MATCHING AUDIO TO VIDEO PUNCHOUT

(71) Applicant: GoPro, Inc., San Mateo, CA (US)

(72) Inventors: Eric Steven Penrod, Brentwood, CA (US); Timothy Dick, San Francisco, CA (US); Erich Tisch, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/532,937

(22) Filed: Dec. 7, 2023

(65) Prior Publication Data
US 2024/0107103 A1  Mar. 28, 2024

Related U.S. Application Data

(63) Continuation of application No. 18/067,440, filed on Dec. 16, 2022, now Pat. No. 11,843,819, which is a continuation of application No. 17/559,182, filed on Dec. 22, 2021, now Pat. No. 11,553,238.

(51) Int. Cl.
| | | |
|---|---|---|
| *H04N 21/43* | (2011.01) | |
| *G06F 1/16* | (2006.01) | |
| *H04N 21/431* | (2011.01) | |
| *H04N 21/44* | (2011.01) | |
| *H04N 21/472* | (2011.01) | |
| *H04N 21/81* | (2011.01) | |

(52) U.S. Cl.
CPC ..... *H04N 21/43072* (2020.08); *G06F 1/1694* (2013.01); *H04N 21/4316* (2013.01); *H04N 21/44008* (2013.01); *H04N 21/47217* (2013.01); *H04N 21/8106* (2013.01)

(58) Field of Classification Search
None
See application file for complete search history.

(56) References Cited

U.S. PATENT DOCUMENTS

| | | |
|---|---|---|
| 11,553,238 B1 | 1/2023 | Penrod |
| 2001/0024233 A1* | 9/2001 | Urisaka ............... H04N 23/661 348/E7.086 |
| 2023/0199243 A1 | 6/2023 | Penrod |

* cited by examiner

*Primary Examiner* — Samira Monshi
(74) *Attorney, Agent, or Firm* — ESPLIN & ASSOCIATES, PC

(57) ABSTRACT

An image capture device may capture multiple audio content during capture of visual content. A viewing window for the visual content and rotational position of the image capture device during capture of the visual content may be used to generate modified audio content from the multiple audio content. The modified audio content may provide sound for playback of a punchout of the visual content using the viewing window.

20 Claims, 8 Drawing Sheets

SYSTEMS AND METHODS FOR MATCHING AUDIO TO VIDEO PUNCHOUT

FIELD

This disclosure relates to modifying audio content to match the punchout of the visual content.

BACKGROUND

An image capture device may capture visual content while positioned in a particular orientation. The image capture device may capture audio content to be used with playback of the visual content. Playback of the visual content may include a punchout of a smaller extent of the visual content. Mismatch between the punchout of the visual content and the spatiality of the audio content may be distracting and/or undesirable.

SUMMARY

This disclosure relates to matching audio to video punchout. Visual information, audio information, rotational position information, and/or other information may be obtained. The visual information may define visual content captured by an image sensor of an image capture device during a capture duration. The audio information may define multiple audio content captured by multiple sound sensors of the image capture device during the capture duration. The rotational position information may characterize rotational positions of the image capture device during the capture duration. A viewing window for the visual content may be determined. The viewing window may define extents of the visual content to be included within a punchout of the visual content. Modified audio content may be generated from the multiple audio content based on the rotational positions of the image capture device during the capture duration, the viewing window for the visual content, and/or other information. The modified audio content may provide sound for playback of the punchout of the visual content.

A system that matches audio to video punchout may include one or more electronic storages, one or more processors, and/or other components. An electronic storage may store visual information defining visual content, information relating to visual content, information relating to image sensor(s), audio information, information relating to audio content, information relating to sound sensors, rotational position information, information relating to rotational positions of an image capture device, information relating to a viewing window, information relating to a punchout of visual content, information relating to modified audio content, and/or other information. In some implementations, the system may include one or more optical elements, one or more image sensors, three or more sound sensors, and/or other components.

In some implementations, multiple sound sensors of an image capture device may include three or more sound sensors. The three or more sound sensors may be positioned on the image capture device on a plane perpendicular to an image sensor axis of the image capture device.

One or more components of the system may be carried by a housing, such as a housing of an image capture device. For example, the optical element(s), the image sensor(s), and/or the sound sensors of the system may be carried by the housing of an image capture device. The housing may carry other components, such as the processor(s) and/or the electronic storage.

The processor(s) may be configured by machine-readable instructions. Executing the machine-readable instructions may cause the processor(s) to facilitate matching audio to video punchout. The machine-readable instructions may include one or more computer program components. The computer program components may include one or more of a visual information component, an audio information component, a rotational position information component, a viewing window component, a modification component, and/or other computer program components.

The visual information component may be configured to obtain visual information and/or other information. The visual information may define visual content captured by one or more image sensors of an image capture device. The visual content may be captured during one or more capture durations. In some implementations, the visual content may have a progress length.

The audio information component may be configured to obtain audio information and/or other information. The audio information may define multiple audio content captured by multiple sound sensors of the image capture device. The multiple audio content may be captured during the capture duration(s).

The rotational position information component may be configured to obtain rotational position information and/or other information. The rotational position information may characterize rotational positions of the image capture device during the capture duration.

The viewing window component may be configured to determine a viewing window for the visual content. The viewing window may define extents of the visual content to be included within a punchout of the visual content.

In some implementations, the viewing window for the visual content may be determined based on the rotational positions of the image capture device during the capture duration to provide a horizon-leveled punchout of the visual content.

In some implementations, the viewing window for the visual content may be determined based on the rotational positions of the image capture device during the capture duration to provide a stabilized punchout of the visual content.

In some implementations, the viewing window for the visual content may be determined based on user selection of the viewing window to provide a user-defined punchout of the visual content.

In some implementations, the visual content may have a progress length, and the viewing window for the visual content may change during the progress length.

The modification component may be configured to generate modified audio content from the multiple audio content. The modified audio content may be generated from the multiple audio content based on the rotational positions of the image capture device during the capture duration, the viewing window for the visual content, and/or other information. The modified audio content may provide sound for playback of the punchout of the visual content.

In some implementations, the modified audio content may be generated to match the horizon-leveled punchout of the visual content. In some implementations, the modified audio content generated to match the horizon-leveled punchout of the visual content may not be aligned with a horizontal axis of the image capture device during the capture duration.

In some implementations, the modified audio content may be generated to match the stabilized punchout of the visual content. In some implementations, the modified audio content may be generated to match the user-defined punchout of the visual content. In some implementations, the modified audio content may be generated to match the changes in the viewing window for the visual content.

In some implementations, the modified audio content may be generated using beamforming. In some implementations, the generation of the modified audio content from the multiple audio content based on the viewing window for the visual content may include modification of the multiple audio content based on difference between a rotation of the viewing window and the rotational positions of the image capture device during the capture duration and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
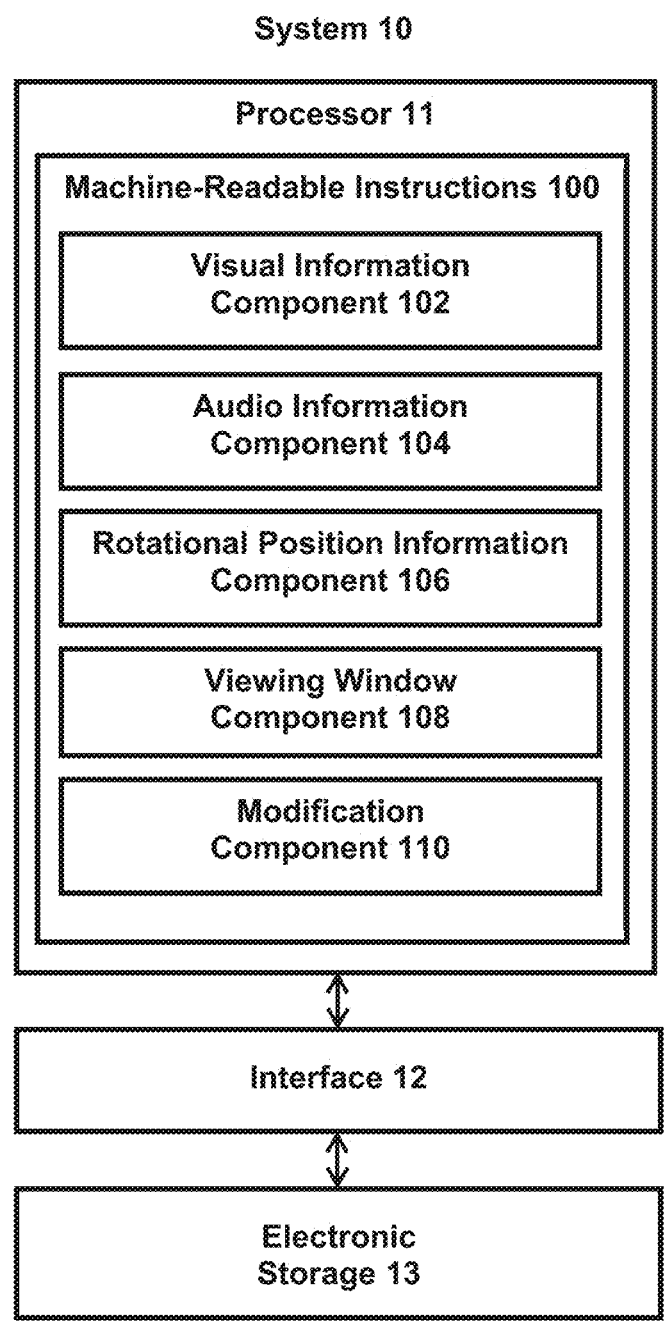
FIG. 1 illustrates an example system for matching audio to video punchout.

FIG. 1 illustrates a system 10 for matching audio to video punchout. The system 10 may include one or more of a processor 11, an interface 12 (e.g., bus, wireless interface), an electronic storage 13, and/or other components. In some implementations, the system 10 may include one or more optical elements, one or more image sensors, three or more sound sensors, and/or other components. Visual information, audio information, rotational position information, and/or other information may be obtained by the processor 11. The visual information may define visual content captured by an image sensor of an image capture device during a capture duration. The audio information may define multiple audio content captured by multiple sound sensors of the image capture device during the capture duration. The rotational position information may characterize rotational positions of the image capture device during the capture duration. A viewing window for the visual content may be determined by the processor 11. The viewing window may define extents of the visual content to be included within a punchout of the visual content. Modified audio content may be generated by the processor 11 from the multiple audio content based on the rotational positions of the image capture device during the capture duration, the viewing window for the visual content, and/or other information. The modified audio content may provide sound for playback of the punchout of the visual content.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information defining visual content, information relating to visual content, information relating to image sensor(s), audio information, information relating to audio content, information relating to sound sensors, rotational position information, information relating to rotational positions of an image capture device, information relating to a viewing window, information relating to a punchout of visual content, information relating to modified audio content, and/or other information.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by an array of sound sensors. The audio content may be captured by sound sensors of the image capture device (e.g., microphones of and/or coupled to the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the visual information. In some implementations, audio information may be stored within one or more audio tracks of a video.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, optical element(s), image sensor(s), and/or sound sensors of the system 10 may be carried by the housing of the image capture device. The housing may carry other components, such as the processor 11 and/or the electronic storage 13.

Figure 3:
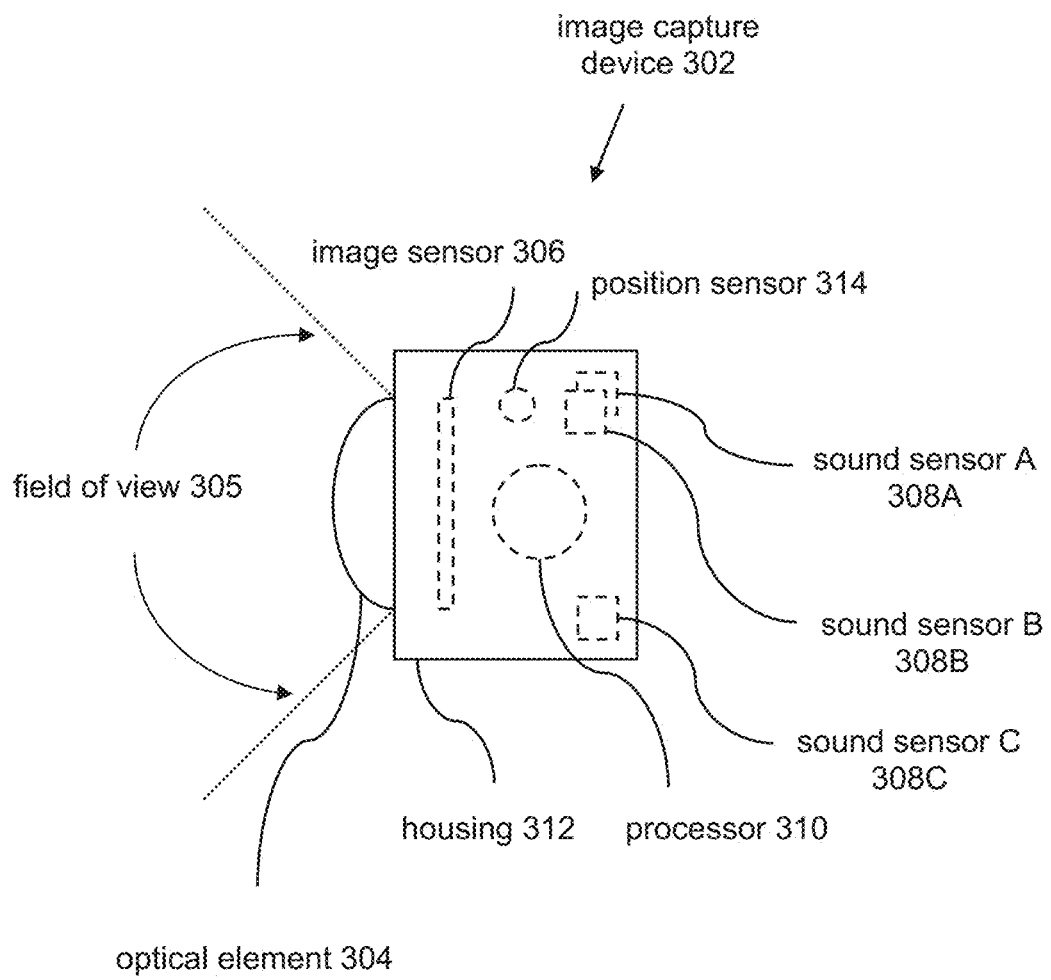
FIG. 3 illustrates an example image capture device.

An image capture device may refer to a device that captures visual content. An image capture device may capture visual content in the form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet). FIG. 3 illustrates an example image capture device 302. Visual content (e.g., of image(s), video frame(s)) may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may carry (be attached to, support, hold, and/or otherwise carry) one or more of an optical element 304, an image sensor 306, a sound sensor A 308A (e.g., top-right sound sensor), a sound sensor B 308B (e.g., top-left sound sensor), a sound sensor C 308C (e.g., bottom sound sensor), a processor 310, a position sensor 314, and/or other components. One or more components of the image capture device 302 may be the same as, be similar to, and/or correspond to one or more components of the system 10. For example, the processor 310 may be the same as, be similar to, and/or correspond to the processor 11. The image capture device 302 may include other components not shown in FIG. 3. The image capture device 302 may not include one or more components shown in FIG. 3. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than or equal to 180-degrees. In some implementations, the field of view 305 may be smaller than or equal to 180-degrees.

In some implementations, the image capture device 302 may include multiple optical elements. For example, the image capture device 302 may include multiple optical elements that are arranged on the housing 312 to capture spherical images/videos (guide light within spherical field of view to one or more images sensors). For instance, the image capture device 302 may include two optical elements positioned on opposing sides of the housing 312. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured to generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 302 may include multiple image sensors. For example, the image capture device 302 may include multiple image sensors carried by the housing 312 to capture spherical images/videos based on light guided thereto by multiple optical elements. For instance, the image capture device 302 may include two image sensors configured to receive light from two optical elements positioned on opposing sides of the housing 312. The fields of views of the optical elements may overlap and enable capture of spherical images and/or spherical videos.

The sound sensor A 308A, the sound sensor B 308B, and the sound sensor C 308C may include sensor(s) (e.g., microphone, component(s) of microphone) that converts received sounds into output signals. The output signals may include electrical signals. The sound sensors 308A, 308B, 308C may generate output signals conveying information based on sounds received by the sound sensors 308A, 308B, 308C. For example, the sound sensor 308A may be configured to generate a sound output signal conveying audio information based on the received sounds. The audio information may define audio content. The audio information may define audio content by including information that defines one or more content, qualities, attributes, features, and/or other aspects of the audio content. For example, the audio information may define audio content by including information that makes up the content of the audio, and/or information that is used to determine the content of the audio. The audio content may include one or more reproductions of the received sounds. The audio information may define audio content in one or more formats, such as WAV, MP3, MP4, RAW, and/or other formats. The audio information may be stored in one or more locations, such as an electronic storage, storage of the sound sensors 308A, 308B, 308C, remote storage, and/or other locations.

While the image capture device 302 is shown with three sound sensors in FIG. 3, this is merely as an example and is not meant to be limiting. In some implementations, the image capture device 302 may have other number of sound sensors (e.g., six sound sensors).

In some implementations, the sound sensors may be positioned on the image capture device on a plane perpendicular to an image sensor axis of the image capture device. That is, the sound sensors may be located in/on the image capture device so that their placement form a plane that is perpendicular to an axis through the image sensor. The sound sensor plane may be perpendicular to the axis running through the image sensor. Such placement of sound sensors may enable the sound sensors to capture audio content that represents the whole of the sound field of the sound sensor plane. The sounds sensors may be placed to create symmetry along multiple axes to route along the image sensor axis. Such placement of sound sensors may enable modification of the directionality of the sounds captured by the sound sensors. For example, the sounds captured by the sound sensors may be manipulated to generate left and right channels that may be rotated around an axis perpendicular to the plane defined by the placement of the sound sensors. If the plane formed by the sound sensors is perpendicular to the image sensor axis, the sounds captured by the sound sensors may be manipulated to generate left and right channels that may be rotated around/about the image sensor axis.

The positions of the sound sensors may deviate from the exact position for establishing perpendicular relationship to the image sensor axis. That is, the sound sensors being positioned on the image capture device on a plane perpendicular to the image sensor axis of the image capture device may include the sound sensors being positioned so that the plane they form is not exactly perpendicular to the image sensor axis. Rather, the plane they form may be close to being perpendicular to the image sensor axis (e.g., deviate by a threshold amount/angle). Similarly, the positioning of the sound sensors may not be exactly symmetrical. Rather, the positioning of the sound sensors may deviate within one or more tolerance values.

Figure 4A:
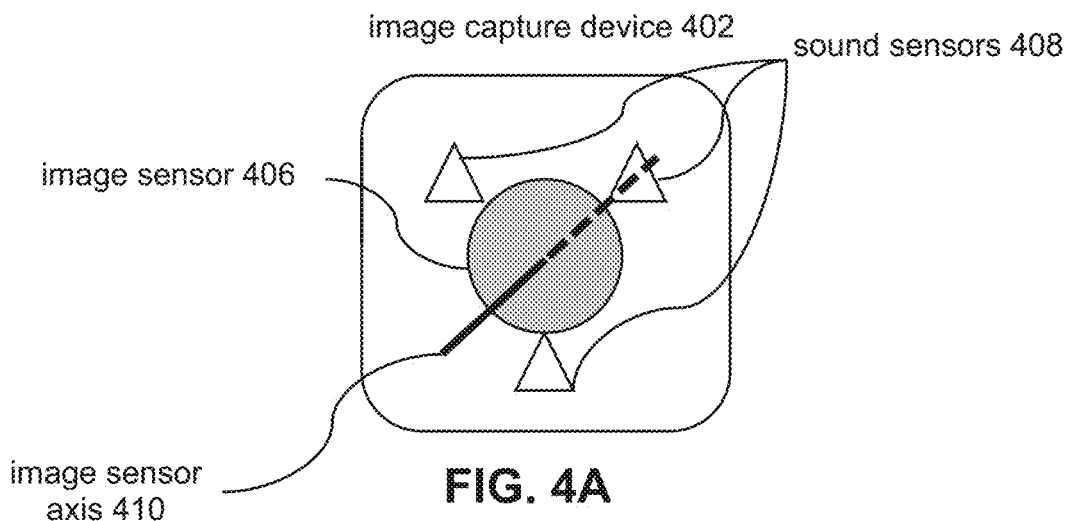
FIGS. 4A and 4B illustrate example placement of sound sensors.
Figure 4B:
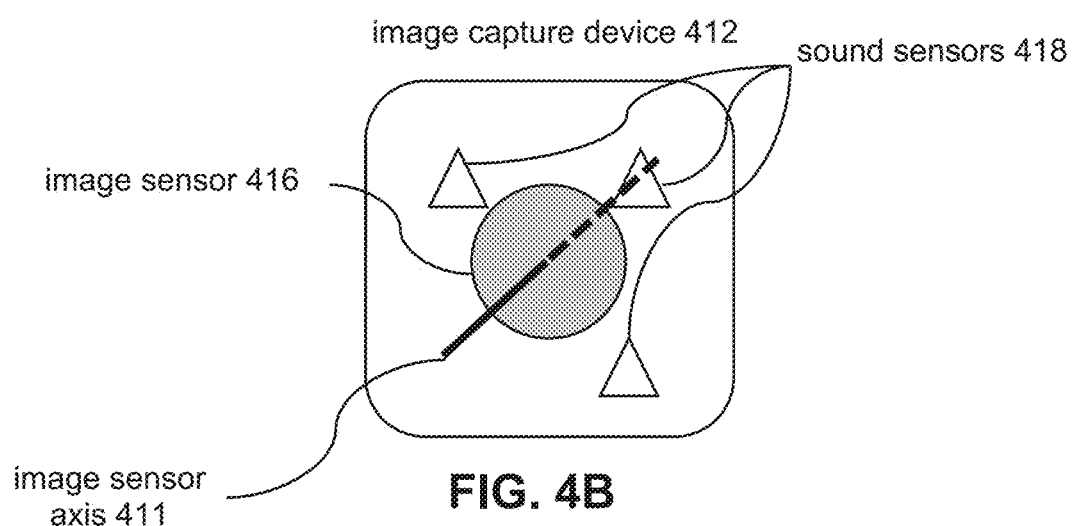

FIGS. 4A and 4B illustrate example placement of sound sensors. In FIG. 4A, an image capture device 402 may include an image sensor 406 and sound sensors 408. The image sensor 406 may be placed with an image sensor axis 410 as shown in FIG. 4A. The sound sensors 408 may be positioned within/on the image capture device 402 as shown in FIG. 4A on a plane perpendicular to the image sensor axis 410 of the image capture device 410. In FIG. 4B, an image capture device 412 may include an image sensor 416 and sound sensors 418. The image sensor 416 may be placed with an image sensor axis 411 as shown in FIG. 4B. The sound sensors 418 may be positioned within/on the image capture device 412 as shown in FIG. 4B on a plane perpendicular to the image sensor axis 411 of the image capture device 412. Other placements of sound sensors are contemplated.

In some implementations, the sound sensors may be omni-directional sound sensors. The omni-directional sound sensors may capture sound equally from all directions. In some implementations, the sound sensors may be directional sound sensors. The directional sound sensor may capture sound with non-uniform sensitivity, with some directions being more sensitive than other directions. The sound captured using the omni-directional/directional sound sensors may be stored/processed in the Ambisonics format. The Ambisonics format may represent the sound field.

The orientation/positioning of the sound sensors in/on the image capture device may be fixed. The sound sensors may be positioned/oriented in/on the image capture device to enable processing of audio content from different directions. Audio content captured by the sound sensors may be processed to capture sounds from one or more particular directions. In some implementations, the sound sensors may be positioned/oriented in/on the image capture device to enable/improve other types of audio processing, such as wind minimization (reduction of sound of wind in the audio content)

The position sensor 314 may include sensor(s) that measures experienced positions and/or motions. The position sensor 314 may convert experienced positions and/or motions into output signals. The output signals may include electrical signals. For example, the position sensor 314 may refer to a set of position sensors, which may include one or more inertial measurement units, one or more accelerometers, one or more gyroscopes, one or more magnetometers, and/or other position sensors. The position sensor 314 may generate output signals conveying information that characterizes positions and/or motions of the position sensor 314 and/or device(s) carrying the position sensor 314, such as the image capture device 302 and/or the housing 312.

For example, the position sensor 314 may be configured to generate a position output signal based on positions of the image capture device 302 during the capture duration. The position output signal may convey position information that characterizes positions of the image capture device 302 at different moments (points in time, time durations) within the capture duration. The position information may characterize positions of the image capture device 302 based on specific translational and/or rotational positions of the image capture device 302 and/or based on changes in translational and/or rotational positions of the image capture device 302 as a function of progress through the capture duration. That is, the position information may characterize translational and/or rotational positions of the image capture device 302 and/or changes in translational and/or rotational positions (motion) of the image capture device 302 (e.g., direction, amount, velocity, acceleration) during the capture duration.

The position information may characterize and/or be used to determine the tilt of the image capture device 302. Tilt of the image capture device 302 may refer to the extent to which image capture device 302 is in a sloping position. Tilt of the image capture device 302 may include rotation of the image capture device about its roll axis and/or other axes. For example, the position information may include the direction of gravity on the image capture device 302 when visual content is captured at different moments within the capture duration, information on the amount of angle by which the image capture device 302 is tilted with respect to horizon, and/or other information that characterizes and/or may be used to determine the tilt of the image capture device 302 (e.g., offset of the image capture device axis with respect to the horizon).

The position information may be determined based on signals generated by the position sensor 314 and independent of the information/signals generated by the image sensor 306. That is, position information may be determined without using visual content/images/videos generated by the image sensor 306. Use of visual content/images/videos to determine positions/motions of the image capture device 302 may be computationally expensive in terms of processing power, processing time, and/or battery consumption.

Using the information/signals from the position sensor 314 to determine positions/motions of image capture device 302 may be computationally cheaper. That is, less processing power, processing time, and/or battery consumption may be required when positions/motions of the image capture device 302 are determined from the information/signals from the position sensor 314 than the information/signals from the image sensor 306. The position information determined independent of the image information may be used to determine the positions of the image capture device 302 during the capture duration.

In some implementations, the position information may include data from the position sensor (e.g., gyroscope data, accelerometer data) with time stamps per visual content capture at different moments. For example, the position may include gyroscope data and/or accelerometer data per individual video frames captured by the image capture device. In some implementations, calibration of an inertial measurement unit may be used to combine different data within the position information.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), facilitate operation of the image sensor 306 (e.g., change how the received light is converted into information that defines images/videos and/or how the images/videos are post-processed after capture), and/or facilitate operation of the sound sensors 308A, 308B, 308C (e.g., change how the received sound is converted into information that defines audio content and/or how the audio content post-processed after capture).

The processor 310 may obtain information from the image sensor 306 and/or the sound sensors 308A, 308B, 308C and/or facilitate transfer of information from the image sensor 306 and/or the sound sensors 308A, 308B, 308C to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

The image capture device 302 may capture visual content and multiple audio content during a capture duration. The multiple audio content may be captured by an array of sound sensors. Separate audio content may be captured by separate sound sensors of the image capture device 302. The visual content, the multiple audio content, and/or other content may be captured by the image capture device 302 for generation of video content.

A viewing window may be used to provide a punchout of the visual content. For example, rather than presenting the entire field of view of the visual content on a display, a smaller portion of the visual content within the viewing window may be presented on the display. Rather than including the entire field of view of the visual content in a video, a smaller portion of the visual content within the viewing window may be included in the video. The viewing window may be rotated (e.g., tilted) within the field of view of the visual content to provide a differently angled view of the visual content than when the entirety of the visual content is presented. For example, the image capture device 302 may have been rotated during visual content capture, and the viewing window may be rotated to provide a horizon-leveled view of the visual content.

The rotational positions of the image capture device 302 during visual content capture and the viewing window for the visual content may be used to generate modified audio content from the multiple audio content. The modified audio content may be generated from the multiple audio content to match the orientation (e.g., with respect to ground, with respect to horizon) of the visual content included within the viewing window/punchout. For example, the multiple audio content captured by the separate audio sensors may be processed to stereo (L/R) signals, with the amount and/or characteristics of the L/R signals being dependent on the rotational positions of the image capture device 302 and the viewing window for the visual content. Such modified audio may match sounds that would have been captured by the image capture device 302 if it had captured the visual content within the viewing window/punchout, rather than the entire field of view of the visual content (e.g., process audio content to capture sounds from the direction that match the L/R of the punch). Such modified audio content may better compliment the playback of the visual content rather than audio content captured from other directions (e.g., audio content captured from all directions).

Figure 5A:
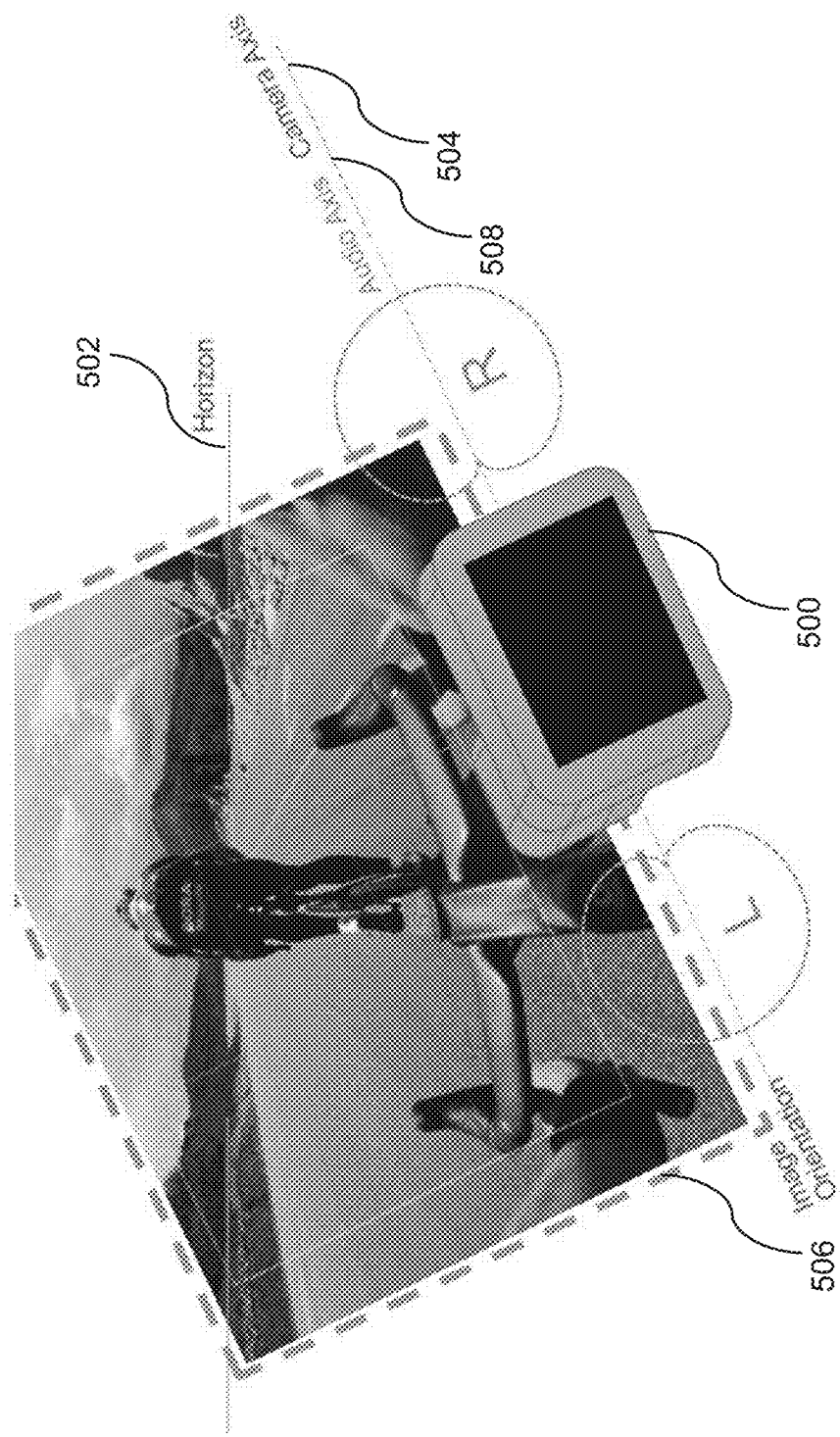
FIGS. 5A, 5B, 5C, and 5D illustrates example orientations between an image capture device, visual content, and audio content.

For example, FIG. 5A illustrates an example orientation between a camera 500, visual content, and audio content. The camera 500 may capture visual content and audio content (left and right channels) while it is tilted with respect to horizon 502. That is, while the camera 500 is capturing the visual content and the audio content, camera axis 504 may not be aligned with the horizon 502. Instead, the camera axis 504 may be tilted from the horizon. Such tilting of the camera 500 may result in misalignment between image orientation 506 (orientation of visual content) and the horizon 502. Similarly, audio axis 508 may not be aligned with the horizon 502. Rather, the image orientation 506 and the audio axis 508 may match the camera axis 504.

Figure 5B:
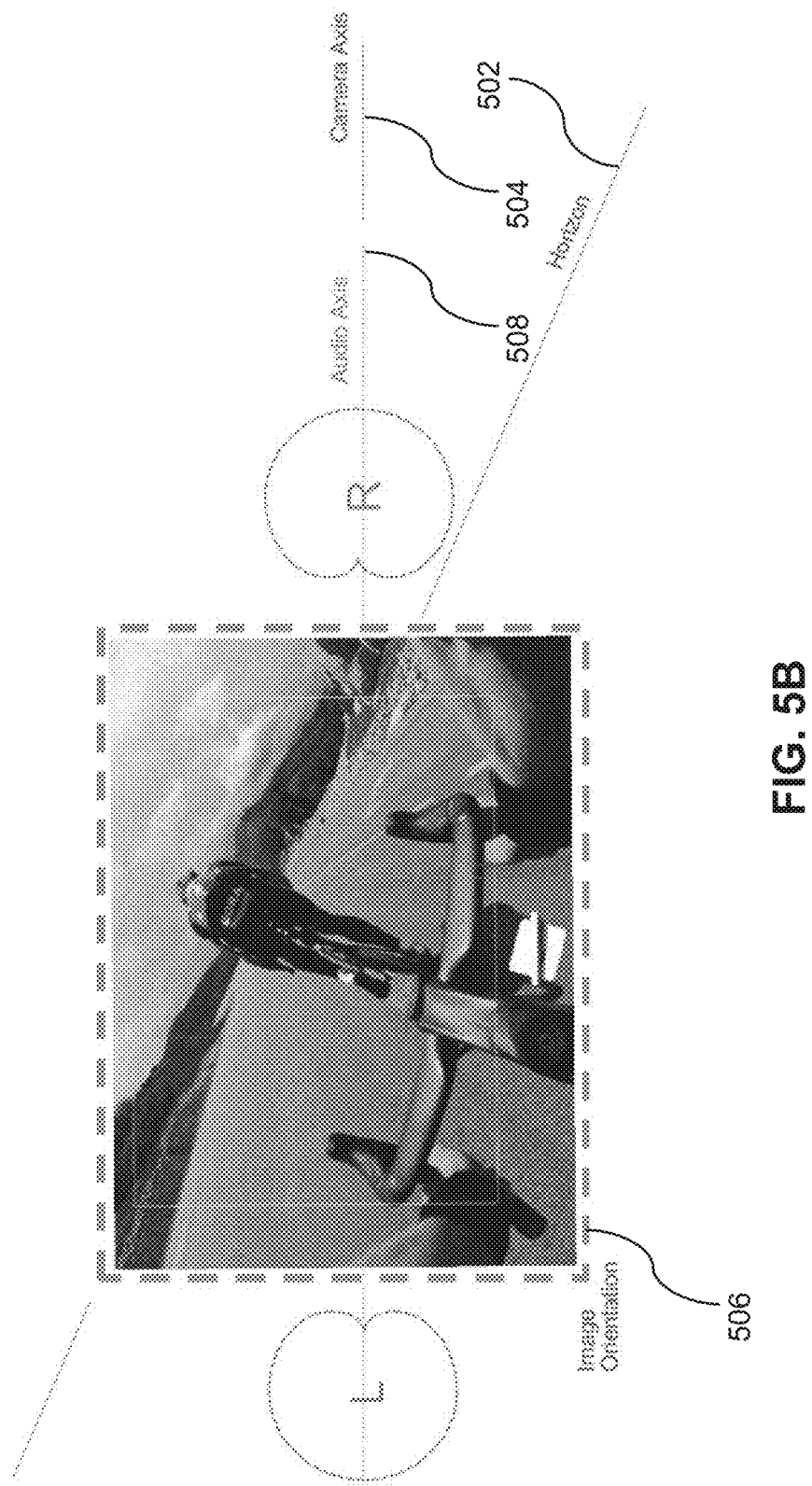

Playback of the entire field of view of the visual content may result in the image orientation 506 being aligned with the audio axis 508 but being misaligned from the horizon 502. For example, FIG. 5B shows the misalignment of the image orientation 506 and the audio axis 508 from the horizon 502 when the entire field of view of the visual content is presented on a display.

Figure 5C:
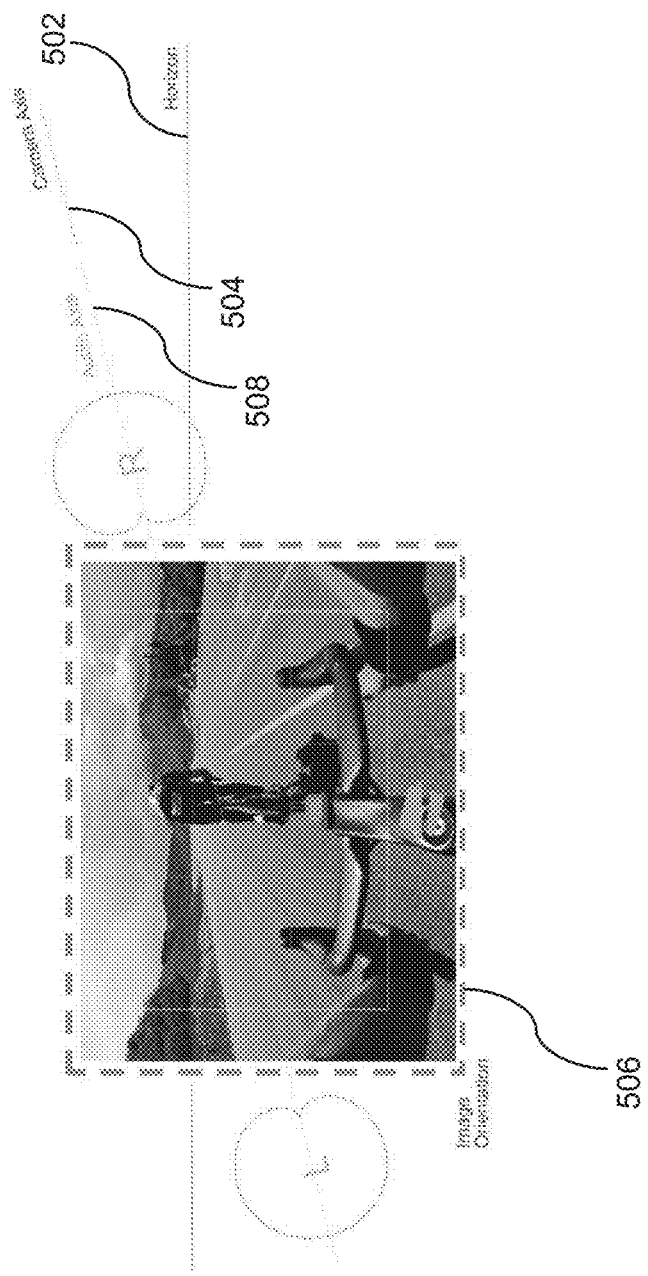

A viewing window may be used to provide a horizon-leveled view of the visual content. For example, the viewing window may be rotated within the field of view of the visual content to provide a view that would have been captured by a leveled camera. FIG. 5C shows an example horizon-leveled punchout of the visual content. The visual content shown in FIG. 5C appears to have been captured by a level camera. Such rotation of the visual content may result in mismatch between the image orientation 506 and the audio axis 508, which remains fixed to the camera axis 504. That is, the orientation of the visual content and the audio content may no longer match because a rotated portion of the visual content is being presented. For example, rotation of the viewing window/punchout by ninety degrees may result in the orientation of the visual content and the audio content being perpendicular to each other. Rotation of the viewing window/punchout by a hundred and eighty degrees may result in the orientation of the visual content and the audio content being opposite of each other.

The multiple audio content captured by the image capture device may be modified so that the orientation of the modified audio content matches the orientation of the visual content punchout. The audio axis may be decoupled from the camera axis so that the audio axis is aligned with the image orientation. For example, if the viewing window for the visual content is rotated within the visual content to provide a horizon-leveled view of the visual content, the multiple audio content may be used to generate modified audio content that is leveled with respect to the horizon. For example, the orientation of the audio axis may be made independent of the position of the image capture device so that the orientation of left and right audio channels is not constrained to the image capture device orientation.

Figure 5D:
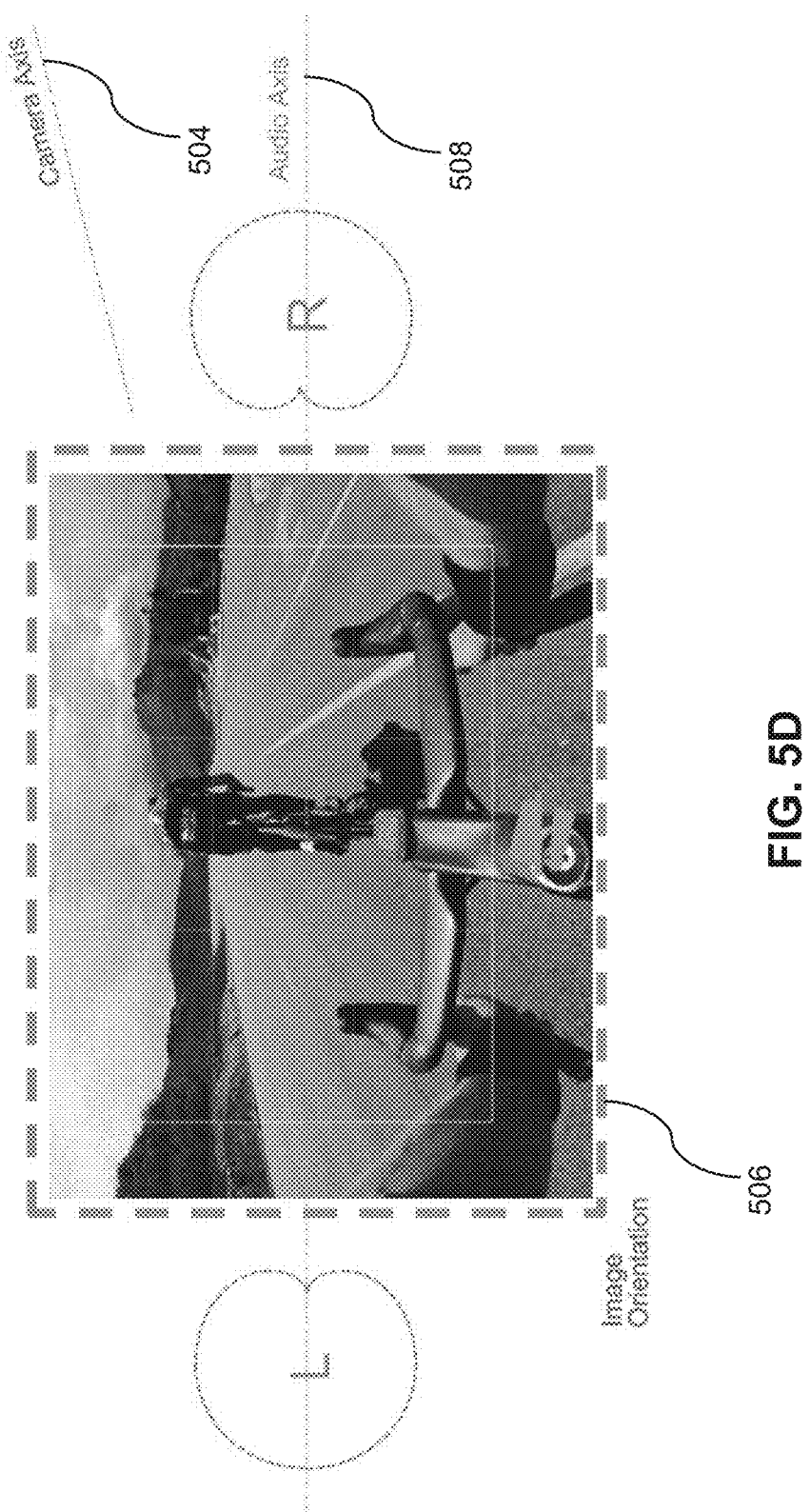

FIG. 5D illustrates an example orientation of the visual content and the audio content so that they are leveled with respect to the horizon. In FIG. 5D, the viewing window may be used to provide a horizon-leveled punchout (e.g., the image orientation 506 is leveled with respect to the horizon). The audio content may be modified so that the audio axis 508 is aligned with the horizon. The audio axis 508 may no longer be aligned with the camera axis 504. By generating modified audio content that matches the rotation of the visual content that is punched out, the visual content may be played with audio content that matches the portion of the visual content being presented.

While the modification of audio content/axis has been described to be aligned with the horizon, this is merely as an example and is not meant to be limiting. The modification of the audio content/axis may be performed to any other rotation of the viewing window within the field of view of the visual content.

Referring back to FIG. 1, the processor 11 (or one or more components of the processor 11) may be configured to obtain information to facilitate matching audio to video punchout. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a sound sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate matching audio to video punchout. The machine-readable instructions 100 may include one or more computer program components. The machine-readable instructions 100 may include one or more of a visual information component 102, an audio information component 104, a rotational position information component 106, a viewing window component 108, a modification component 110, and/or other computer program components.

The visual information component 102 may be configured to obtain visual information and/or other information. Obtaining visual information may include one or more of accessing, acquiring, analyzing, determining, examining, identifying, loading, locating, opening, receiving, retrieving, reviewing, selecting, storing, and/or otherwise obtaining the visual information. The visual information component 102 may obtain visual information from one or more locations. For example, the visual information component 102 may obtain visual information from a storage location, such as the electronic storage 13, electronic storage of information and/or signals generated by one or more sensors, electronic storage of a device accessible via a network, and/or other locations. The visual information component 102 may obtain visual information from one or more hardware components (e.g., an image sensor) and/or one or more software components (e.g., software running on a computing device).

Visual information may be obtained during acquisition of the visual content and/or after acquisition of the visual content. For example, the visual information component 102 may obtain visual information defining visual content while the visual content is being captured by one or more image sensors. The visual information component 102 may obtain visual information defining visual content after the visual content has been captured and stored in memory (e.g., the electronic storage 13).

In some implementations, the visual information component 102 may obtain visual information based on user interaction with a user interface/application (e.g., video/image editing application, video player/image viewer application), and/or other information. For example, a user interface/application may provide option(s) for a user to select one or more visual content for which modified audio content is to be generated. The visual information defining the visual content may be obtained based on the user's selection of the visual content through the user interface/application. Other selections of visual content for retrieval of visual information are contemplated.

The visual information may define visual content captured by one or more image sensors of an image capture device. For example, the visual information may define visual content captured by the image sensor 306 of the image capture device 302. The visual content may be captured during one or more capture durations. The visual content may have a progress length. The progress length of the visual content may be same as and/or determined based on the capture duration(s). For example, the progress length of the visual content may be the same as the capture duration(s) (total length of capture duration(s)) based on the capture rate (e.g., capture FPS) being the same as the playback rate (e.g., playback FPS). The progress length of the visual content may be different from the capture duration(s) based on the capture rate being different form the playback rate (e.g., fraction/multiple of the total length of the capture duration(s)). The visual content may be defined by the visual information as a function of progress through the progress length. For example, the visual information may define visual content of images/video frames, with the images/video frames being associated with different moments within the progress length.

The audio information component 104 may be configured to obtain audio information and/or other information. Obtaining audio information may include one or more of accessing, acquiring, analyzing, determining, examining, identifying, loading, locating, opening, receiving, retrieving, reviewing, selecting, storing, and/or otherwise obtaining the audio information. The audio information component 104 may obtain audio information from one or more locations. For example, the audio information component 104 may obtain audio information from a storage location, such as the electronic storage 13, electronic storage of information and/or signals generated by one or more sensors, electronic storage of a device accessible via a network, and/or other locations. The audio information component 104 may obtain audio information from one or more hardware components (e.g., a sound sensor) and/or one or more software components (e.g., software running on a computing device).

Audio information may be obtained during acquisition of multiple audio content and/or after acquisition of the multiple audio content by multiple sound sensors. For example, the audio information component 104 may obtain audio information defining audio content while the multiple audio content is being captured by an array of sound sensors (e.g., an array of three or more sound sensors). The audio information component 104 may obtain audio information defining multiple audio content after the multiple audio content has been captured and stored in memory (e.g., the electronic storage 13).

In some implementations, the audio information component 104 may obtain audio information based on user interaction with a user interface/application (e.g., video/image editing application, video player/image viewer application), and/or other information. For example, a user interface/application may provide option(s) for a user to select multiple audio content from which modified audio content is to be generated. The audio information defining the multiple audio content may be obtained based on the user's selection of the multiple audio content through the user interface/application. Other selections of multiple audio content for retrieval of audio information are contemplated.

The audio information may define multiple audio content captured by multiple sound sensors of the image capture device. For example, the audio information may define multiple audio content captured by the sound sensors 308A, 308B, 308C of the image capture device 302. For instance, the multiple audio content may include first audio content captured by the sound sensor A 308A, second audio content captured by the sound sensor B 308B, third audio content captured by the sound sensor C 308C, and/or other audio content. The multiple audio content may be captured during one or more capture durations. The multiple audio content may be captured during capture duration(s) in which visual content is captured. Some or all of the audio content may be captured concurrently with the visual content. That is, the capture duration(s) of the audio content may be the same as or overlap with the capture duration(s) of the visual content. For example, the image capture device 302 may concurrently capture visual content and multiple audio content using the image sensor 306 and the sound sensors 308A, 308B, 308C respectively.

The multiple audio content may have a progress length. The progress length of the multiple audio content may be same as and/or determined based on the capture duration(s). For example, the progress length of the multiple audio content may be the same as the capture duration(s) (total length of capture duration(s)) based on the capture rate being the same as the playback rate. The progress length of the multiple audio content may be different from the capture duration(s) based on the capture rate being different form the playback rate. The multiple audio content may be defined by the audio information as a function of progress through the progress length. For example, the audio information may define recorded sounds, with different time portions of recorded sounds being associated with different moments within the progress length.

The rotational position information component 106 may be configured to obtain rotational position information and/ or other information. Obtaining rotational position information may include one or more of accessing, acquiring, analyzing, determining, examining, identifying, loading, locating, opening, receiving, retrieving, reviewing, selecting, storing, and/or otherwise obtaining the rotational position information. The rotational position information component 106 may obtain rotational position information from one or more locations. For example, the rotational position information component 106 may obtain rotational position information from a storage location, such as the electronic storage 13, electronic storage of information and/or signals generated by one or more sensors, electronic storage of a device accessible via a network, and/or other locations. The rotational position information component 106 may obtain rotational position information from one or more hardware components (e.g., a position sensor) and/or one or more software components (e.g., software running on a computing device).

In some implementations, the rotational position information component 106 may obtain rotational position information for a video while the video is being captured by the image capture device. The rotational position information component 106 may obtain rotational position information for the video during generation of the position output signal by the position sensor. The rotational position information component 106 may obtain rotational position information for the video after the video/position information has been captured and stored in memory (e.g., the electronic storage 13). In some implementations, the rotational position information component 106 may be configured to obtain other position information (e.g., translational position information).

The rotational position information may characterize rotational positions of the image capture device during the capture duration. The rotational position information may characterize rotational positions of the image capture device that captured the visual content and the multiple audio content during the capture duration. The rotational position information may characterize rotational positions of the image capture device as a function of progress through the capture. The rotational position information may describe and/or define the rotational positions of the image capture device at different moments within the capture duration and/or changes in rotational positions (motion) of the image capture device at different moments within the capture duration. For example, the rotational position information may characterize and/or be used to determine the tilt of the image capture device that captured the video/video content. For instance, the rotational position information may include the direction of gravity on the image capture device at different moments within the capture duration, information on the amount of angle by which the image capture device is tilted with respect to horizon, and/or other information that characterizes and/or may be used to determine the tilt of the image capture device.

The viewing window component 108 may be configured to determine a viewing window for the visual content. Determining the viewing window for the visual content may include ascertaining, establishing, extracting, finding, identifying, obtaining, setting, and/or otherwise determining the field of view of the visual content. The viewing window component 108 may determine a viewing window for the visual content as a function of progress through the progress length of the visual content. A viewing window may be characterized by viewing directions, viewing sizes (e.g., viewing zoom, viewing magnification), viewing rotations, and/or other information. One or more of rotation, location, shape, size, and/or other characteristics of the viewing window may be determined for different moments within the progress length of the visual content.

The viewing window for the visual content may change during the progress length. That is, rather than the viewing window being static, one or more characteristics of the viewing window (e.g., direction, size, rotation) may change during the progress length. For example, differently sized, rotated, and/or positioned punchout may be used for the visual content. The viewing window component 108 may determine viewing window at different moments within the progress length. The viewing window component 108 may determine changes to the viewing window during the progress length.

A viewing direction may define a direction of view for visual content. A viewing direction may define the angle/ visual portion of the visual content at which the viewing window may be directed. A viewing direction may define the location of the viewing window within the field of view of the visual content. Changes in the viewing direction as the function of progress through the progress length may effectuate movement (e.g., panning) of the viewing window within the field of view of the visual content.

A viewing size may define a size of the viewing window. A viewing size may define a size (e.g., size, magnification, viewing angle) of viewable extents of visual content. A viewing size may define the dimensions of the viewing window. In some implementations, a viewing size may define different shapes of the viewing window/viewable extents. For example, a viewing window may be shaped as a rectangle, a triangle, a circle, and/or other shapes. A viewing size may define different aspect ratios of the viewing window (e.g., 4:3 aspect ratio, 16:9 aspect ratio, 1:1 aspect ratio). Changes in the viewing size (sizes of the viewing window) as the function of progress through the progress length may simulate changes in zoom of the visual content. The viewing size may be increased to simulate decrease in zoom of the visual content. The viewing size may be decreased to simulate increase in zoom of the visual content.

A viewing rotation may define a rotation of the viewing window. A viewing rotation may define one or more rotations of the viewing window about one or more axis. For example, a viewing rotation may be defined based on rotation about an axis corresponding to a viewing direction (e.g., roll). Changes in the viewing rotation as the function of progress through the progress length may effectuate rotation of the viewing window within the field of view of the visual content. The rotation of the viewing window may compensate for rotation of the image capture device (e.g., tilt) during capture duration.

The viewing window may define one or more extents of the visual content. The viewing window may define the extent(s) of the visual content to be included within a punchout of the visual content. The viewing window may define which portions of the visual content are included within the punchout of the visual content at different moment within the progress length. A punchout of the visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial portions of the visual content.

For example, the visual content may include a field of view, and the punchout of the visual content may include the entire extent of the visual content (the visual content within the entire field of view) or one or more extents of the visual content (the visual content within one or more portions of the field of view). A viewing window may define extents of the visual content to be included within a punchout of the visual content as the function of progress through the progress length. A viewing window may correspond to the entire progress length or for one or more portions (e.g., portions including moments of interest) of the progress length. The punchout of the visual content may be presented on one or more displays, included in one or more videos, and/or otherwise used for presenting a view of the visual content.

some implementations, the viewing window for the visual content may be determined based on the rotational positions of the image capture device during the capture duration. For example, the placement of the viewing window within the field of view of the visual content may be determined as the function of progress through the progress length based on the rotational positions of the image capture device as the function of progress through the capture duration and/or other information. The placement of the viewing window may refer to how the viewing window is positioned within the field of view of the visual content. The placement of the viewing window may be determined by one or more of direction, size, rotation, and/or other characteristics of the viewing window. One or more of direction, size, rotation, and/or other characteristics of the viewing window may be determined for different moments within the progress length of the visual content based on the rotational positions of the image capture device during corresponding moments within the capture duration and/or other information.

In some implementations, the viewing window for the visual content may be determined based on the rotational positions of the image capture device during the capture duration to provide a horizon-leveled punchout of the visual content. The direction, size, rotation, and/or other characteristics of the viewing window may be determined based on the rotational positions of the image capture device to provide a horizon-leveled punchout of the visual content. A horizon-leveled punchout of the visual content may refer to a punchout of the visual content that provides a horizon-leveled view of the visual content. A horizon leveled punchout of the visual content may refer to a punchout of the visual content in which extents of the visual content are selected for presentation such that the visual content appears leveled/more leveled with respect to the horizon. The horizon leveled view of the visual content may refer to view of the visual content in which the visual content appears leveled with respect to the horizon. The horizon leveled view of the visual content may refer to view of the visual content in which the visual content appears more leveled with respect to the horizon than the original visual content. For example, the image capture device may have been tilted to the left and/or right during the capture duration. The viewing window may be determined to compensate for the tiling of the image capture device during the capture duration such that the horizon-leveled punchout of the visual content provides a view of the visual content that appears to have been captured by the image capture device without/with less tilting.

In some implementations, the viewing window for the visual content may be determined based on the rotational positions of the image capture device during the capture duration to provide a stabilized punchout of the visual content. The direction, size, rotation, and/or other characteristics of the viewing window may be determined based on the rotational positions of the image capture device to provide a stabilized punchout of the visual content. A stabilized punchout of the visual content may refer to a punchout of the visual content that provides a stabilized view of the visual content. A stabilized punchout of the visual content may refer to a punchout of the visual content in which extents of the visual content are selected for presentation such that the visual content appears stable/more stable. The stabilized view of the visual content may refer to view of the visual content in which the visual content appears stable. The stabilized view of the visual content may refer to view of the visual content in which the visual content appears more stable than the original visual content (e.g., includes less shakes and/or jitters than the original visual content). For example, the image capture device may have been shaken and/or experience vibration during the capture duration. The viewing window may be determined to compensate for the shaking and/or vibration of the image capture device during the capture duration such that the stabilized punchout of the visual content provides a view of the visual content that appears to have been captured by the image capture device without/with shaking and/or vibration.

In some implementations, the viewing window for the visual content may be determined based on user selection of the viewing window to provide a user-defined punchout of the visual content. The direction, size, rotation, and/or other characteristics of the viewing window may be determined based on user selection of the direction, size, rotation, and/or other characteristics of the viewing window. A user-defined punchout of the visual content may refer to a punchout of the visual content that provides a view of the visual content manually selected by the user. For example, a user may provide inputs into the system 10 on which portions of the visual content should be presented for different moments within the progress length of the visual content. The characteristics of the viewing window may be defined by the inputs provided by the user. Other determination of the viewing window for the visual content is contemplated.

The modification component 110 may be configured to generate modified audio content. The modified audio content may be generated from the multiple audio content. The modified audio content may be generated by combining one or more portions of the multiple audio content. The modified audio content may be generated by using one or more portions of the multiple audio content. The modified audio content may be generated to match the punchout of the visual content provided using the viewing window. That is, the spatiality of the modified audio content may match the punchout of the visual content. The spatiality of the modified audio content may refer to the spatial aspect of the modified audio content, such as the direction in which sounds captured by the sound sensors of the image capture device are output during playback. The modified audio content generated to match the punchout of the visual content, such as the horizon-leveled punchout of the visual content, may not be aligned with a horizontal axis of the image capture device during the capture duration. For example, as shown in FIG. 5D, the audio axis (the audio axis 508) of the modified audio content may not be aligned with the horizontal axis (the camera axis 504) of the image capture device.

The modified audio content may provide sound for playback of the punchout of the visual content (e.g., real-time playback, stored for playback at another time). The modified audio content may be stored with or separate from the visual content. The modified audio content may be stored with or separate from the punchout of the visual content.

The modified audio content may be generated from the multiple audio content based on the viewing window, and/or other information. For example, the modified audio content may be generated from the multiple audio content based on the rotation of the viewing window for the visual content with respect to the field of view of the visual content. The rotation of the viewing window with respect to the field of view of the visual content may indicate how the punchout of the visual content will be rotated with respect to the axis of the image capture device/original audio axis. The modified audio content may be generated so that the audio axis of the modified audio content is aligned with/matches the image orientation. That is, the modified audio content may be generated using the rotation of the viewing window to match the orientation of the audio content with the orientation of the visual content.

The modified audio content may be generated from the multiple audio content based on the rotational positions of the image capture device during the capture duration, and/or other information. For example, the rotational positions of the image capture device during the capture duration may be used to determine the viewing window for the visual content (e.g., the rotation of the viewing window), and the modified audio content may be generated from the multiple audio content to compensate for the rotation of the viewing window with respect to field of view of the visual content. Thus, the rotational positions of the image capture device may be used to both (1) determine the viewing window for the visual content, and (2) generate the modified audio content to match the orientation of the modified audio content to the orientation of the visual content within the viewing window.

For example, the rotational positions of the image capture device during the capture duration may be used to provide a horizon-leveled punchout of the visual content, and the modified audio content may be generated based on the rotational positions of the image capture device (based on the rotation of the viewing window to provide the horizon-leveled punchout) to match the horizon-leveled punchout of the visual content. The orientation of the modified audio content may match the orientation of the horizon-leveled view of the visual content.

As another example, the rotational positions of the image capture device during the capture duration may be used to provide a stabilized punchout of the visual content, and the modified audio content may be generated based on the rotational positions of the image capture device (based on the rotation of the viewing window to provide the stabilized punchout) to match the stabilized punchout of the visual content. The orientation of the modified audio content may match the orientation of the stabilized view of the visual content.

In some implementations, the generation of the modified audio content from the multiple audio content based on the viewing window for the visual content may include modification of the multiple audio content based on difference between a rotation of the viewing window and the rotational positions of the image capture device during the capture duration and/or other information. How much the viewing window is offset (e.g., in degrees) from the rotational positions of the image capture device may be used to determine how the multiple audio content needs to be rotated/oriented.

In some implementations, modified audio content may be generated from the multiple audio content independent of the rotational positions of the image capture device during the capture duration. For example, the rotation of the viewing window may be defined by a user to provide a user-defined punchout of the visual content, and the modified audio content may be generated based on the user-defined rotation of the viewing window so that the modified audio content may be generated to match the user-defined punchout of the visual content. The orientation of the modified audio content may match the orientation of the user-defined view of the visual content.

In some implementations, the modified audio content may be generated to match changes in the viewing window for the visual content. For example, the rotation of the viewing window may change over the progress length of the visual content, and the modified audio content may be generated to maintain the match in orientation of the visual content with respect to the orientation of the audio content. Such generation of the modified audio content may dynamically adjust the direction of audio content to match the changes in the viewing window for the visual content.

In some implementations, the modified audio content may be generated from the multiple audio content by using the positioning/orientation of the sound sensors that captured the multiple audio content. For example, the known position/orientation of the sound sensors may be used in combination with the rotation of the viewing window to process the individual ones of the multiple audio content. Individual ones of the multiple audio content may be processed based on the positioning/orientation of the sound sensors that captured the audio content and the rotation of the viewing window to form audio content for playback from different directions. The modified audio content may be generated using the positioning/orientation of the sound sensors to generate different channels within the modified audio content that matches the rotation of the viewing window for the visual content.

In some implementations, the modified audio content may be generated using beamforming. Beamforming may utilize spatial filtering to separate components of the multiple audio content into different channels of the modified audio content. Beamforming may filter and/or combine the multiple audio content to extract (e.g., constructively combine) the desired components of the multiple audio content and/or reject (e.g., destructively combine) the undesired components (e.g., interfering components) of the multiple audio content in accordance with their spatial locations. For example, by using beamforming, the sounds captured with the image capture device orientated in a particular manner may be transformed (e.g., reduced, increased) in one or more channels to align the modified audio content with the visual content within the viewing window.

In some implementations, the modified audio content may be generated using Ambisonics. The multiple audio content may be stored and/or processed using Ambisonics, and the modified audio content may be generated to match the rotation of the punchout of the visual content by using one or more virtual microphones to determine how the portions of the multiple audio content should be arranged (e.g., included, emphasized, switched) within the modified audio content. For example, the multiple audio content stored in an Ambisonics format may be rendered to create virtual microphones that are oriented to match the L/R of the punchout. Use of other techniques to generate modified audio content is contemplated.

In some implementations, the modified audio content may be stored with the punch of the visual content. For example, for horizon-leveled punchout of the visual content, data from multiple sound sensors may be processed on the image capture device to generate left and right channels of the modified audio content. The left and right channels (e.g., left and right cardioid channels) may be generated based on the viewing window rotation required to make the horizon level within the punchout. The left and right channels may be written into the video file, along with the horizon-leveled punchout of the visual content.

In some implementations, audio content may be stored with information to generate the modified audio content. For example, visual content, multiple audio content, and rotational position information may be stored in a video file. When horizon-leveled punchout of the visual content is to be presented, the rotational position information within the video file may be used to (1) determine the rotation of the viewing window to provide a horizon-leveled view, and (2) generate the modified audio content to provide sound for playback (e.g., horizon-leveled audio content).

In some implementations, audio content and/or visual content may be partially processed by the image capture device. For example, the audio content may be processed by the image capture device into an intermediate transport format (e.g., Ambisonic Audio) containing the whole of the planar audio information. The visual content and the partially processed audio content may be used at a later time (e.g., by the image capture device, by another computing device) to generate the punchout of the visual content and the modified audio content that matches the punchout.

Video content may be generated to include the visual content, the modified audio content, and/or other content. The video content may define visual content viewable as a function of progress through a progress length of the video content. The visual content may be defined within one or more video frames of the video content. The visual content defined by the visual information may form the visual content of the video frame(s) of the video content. The visual content defined by the visual information may be used to generate the visual content of the video frame(s) of the video content. The modified audio content may provide sound for playback of the visual content with the field of view. Using the modified audio content to generate the video content may enable generation of video content with audio content that matches the rotation of the punchout of the visual content. Playback of such video content may be more engaging than video content in which the audio content does not match the rotation of the punchout of the visual content The video content, the modified audio content, and/or other information may be stored in one or more storage media. For example, the video content and/or modified audio content may be stored in the electronic storage 13, remote storage locations (storage media located at/accessible through a server), and/or other locations. In some implementations, the video content and/or modified audio content may be stored through one or more intermediary devices. For example, the processor 11 may be located within a computing device without connection to the storage device (e.g., the computing device lacks WiFi/cellular connection to the storage device). The video content may be stored through another device that has the necessary connection to the storage device (e.g., the computing device using a WiFi/cellular connection of a paired mobile device, such as a smartphone, tablet, laptop, to store information in one or more storage media). Other storage locations for and storage of the video content and/or modified audio content are contemplated.

In some implementations, the processor 11 may represent multiple processors, and at least one of the processors may be a remote processor located remotely from the housing of the image capture device (e.g., the image capture device 302). One or more of the functionalities of the components 102, 104, 106, 108,110 may be performed by the image capture device 302 (e.g., by the processor 310) and/or by a remote processor. For example, viewing window determination (functionalities of the viewing window component 108) and/or modified audio content generation (functionality of the modified component 110) may be performed by the remote processor during and/or post capture of the visual content and the audio content by the image capture device. As another example, modified audio content generation may be performed by the processor 310 during capture of the visual content and the audio content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
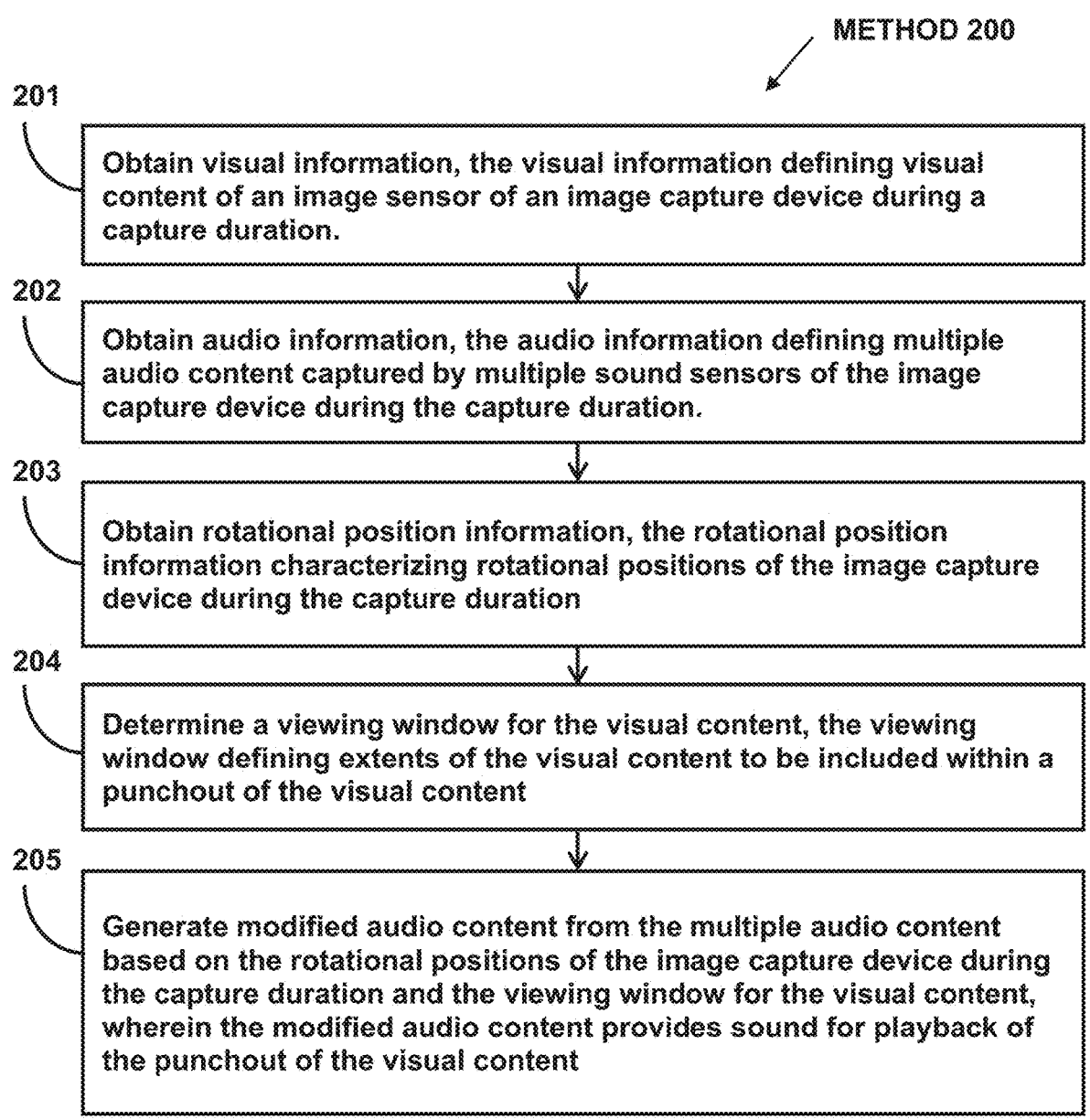
FIG. 2 illustrates an example method for matching audio to video punchout.

FIG. 2 illustrates method 200 for matching audio to video punchout. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, visual information may be obtained. The visual information may define visual content captured by an image sensor of an image capture device during a capture duration. In some implementations, operation 201 may be performed by a processor component the same as or similar to the visual information component 102 (Shown in FIG. 1 and described herein).

At operation 202, audio information may be obtained. The audio information may define multiple audio content captured by multiple sound sensors of the image capture device during the capture duration. In some implementations, operation 202 may be performed by a processor component the same as or similar to the audio information component 104 (Shown in FIG. 1 and described herein).

At operation 203, rotational position information may be obtained. The rotational position information may characterize rotational positions of the image capture device during the capture duration. In some implementations, operation 203 may be performed by a processor component the same as or similar to the rotational position information component 106 (Shown in FIG. 1 and described herein).

At operation 204, a viewing window for the visual content may be determined. The viewing window may define extents of the visual content to be included within a punchout of the visual content. In some implementations, operation 204 may be performed by a processor component the same as or similar to the viewing window component 108 (Shown in FIG. 1 and described herein).

At operation 205, modified audio content may be generated from the multiple audio content based on the rotational positions of the image capture device during the capture duration and the viewing window for the visual content. The modified audio content may provide sound for playback of the punchout of the visual content. In some implementations, operation 205 may be performed by a processor component the same as or similar to the modification component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for matching audio to video punchout, the system comprising:
one or more physical processors configured by machine-readable instructions to:
obtain visual information, the visual information defining visual content captured by an image capture device during a capture duration;
obtain audio information, the audio information defining multiple audio content captured by multiple sound sensors during the capture duration;
determine a viewing window for the visual content, the viewing window defining extents of the visual content to be included within a punchout of the visual content, wherein the viewing window for the visual content is determined based on rotational positions of the image capture device during the capture duration to provide a horizon-leveled punchout of the visual content; and
generate modified audio content from the multiple audio content based on the viewing window for the visual content to match orientation of the extents of the visual content included within the punchout of the visual content, wherein the modified audio content is generated to match changes in the viewing window for the visual content, the modified audio content is generated to match the horizon-leveled punchout of the visual content.

2. The system of claim 1, wherein the modified audio content generated to match the horizon-leveled punchout of the visual content is not aligned with a horizontal axis of the image capture device during the capture duration.

3. The system of claim 2, wherein:
the viewing window for the visual content is determined further based on the rotational positions of the image capture device during the capture duration to provide a stabilized punchout of the visual content; and
the modified audio content is generated to match the stabilized punchout of the visual content.

4. The system of claim 1, wherein:
the viewing window for the visual content is determined further based on user selection of the viewing window to provide a user-defined punchout of the visual content; and
the modified audio content is generated to match the user-defined punchout of the visual content.

5. The system of claim 1, wherein the modified audio content is generated using beamforming.

6. The system of claim 5, wherein the generation of the modified audio content from the multiple audio content based on the viewing window for the visual content includes modification of the multiple audio content based on difference between a rotation of the viewing window and rotational positions of the image capture device during the capture duration.

7. The system of claim 6, wherein:
the multiple sound sensors include three or more sound sensors; and
the three or more sound sensors are positioned on the image capture device on a plane perpendicular to an image sensor axis of the image capture device.

8. The system of claim 7, wherein the generation of the modified audio content from the multiple audio content includes rotation of audio channels around or about the image sensor axis of the image capture device.

9. A method for matching audio to video punchout, the method performed by a computing system including one or more processors, the method comprising:
obtaining, by the computing system, visual information, the visual information defining visual content captured by an image capture device during a capture duration;
obtaining, by the computing system, audio information, the audio information defining multiple audio content captured by multiple sound sensors during the capture duration;
determining, by the computing system, a viewing window for the visual content, the viewing window defining extents of the visual content to be included within a punchout of the visual content, wherein the viewing window for the visual content is determined based on rotational positions of the image capture device during the capture duration to provide a horizon-leveled punchout of the visual content; and
generating, by the computing system, modified audio content from the multiple audio content based on the viewing window for the visual content to match orientation of the extents of the visual content included within the punchout of the visual content, wherein the modified audio content is generated to match changes in the viewing window for the visual content, the modified audio content is generated to match the horizon-leveled punchout of the visual content.

10. The method of claim 9, wherein the modified audio content generated to match the horizon-leveled punchout of the visual content is not aligned with a horizontal axis of the image capture device during the capture duration.

11. The method of claim 9, wherein:
the viewing window for the visual content is determined further based on the rotational positions of the image capture device during the capture duration to provide a stabilized punchout of the visual content; and
the modified audio content is generated to match the stabilized punchout of the visual content.

12. The method of claim 9, wherein:
the viewing window for the visual content is determined further based on user selection of the viewing window to provide a user-defined punchout of the visual content; and
the modified audio content is generated to match the user-defined punchout of the visual content.

13. The method of claim 9, wherein the modified audio content is generated using beamforming.

14. The method of claim 13, wherein generating the modified audio content from the multiple audio content based on the viewing window for the visual content includes modifying the multiple audio content based on difference between a rotation of the viewing window and rotational positions of the image capture device during the capture duration.

15. The method of claim 14, wherein:
the multiple sound sensors include three or more sound sensors; and
the three or more sound sensors are positioned on the image capture device on a plane perpendicular to an image sensor axis of the image capture device.

16. The method of claim 15, wherein generating the modified audio content from the multiple audio content includes rotating audio channels around or about the image sensor axis of the image capture device.

17. A system for matching audio to video punchout, the system comprising:
one or more physical processors configured by machine-readable instructions to:
obtain visual information, the visual information defining visual content captured by an image capture device during a capture duration;
obtain audio information, the audio information defining multiple audio content captured by three or more sound sensors during the capture duration;
determine a viewing window for the visual content, the viewing window defining extents of the visual content to be included within a punchout of the visual content, wherein the viewing window for the visual content is determined based on rotational positions of the image capture device during the capture duration to provide a horizon-leveled punchout of the visual content; and
generate modified audio content from the multiple audio content using beamforming based on the viewing window for the visual content to match orientation of the extents of the visual content included within the punchout of the visual content, the modified audio content providing sound for playback of the punchout of the visual content, wherein the modified audio content is generated to match changes in the viewing window for the visual content, the modified audio content is generated to match the horizon-leveled punchout of the visual content.

18. The system of claim 17, wherein:
the three or more sound sensors are positioned on the image capture device on a plane perpendicular to an image sensor axis of the image capture device;
the generation of the modified audio content from the multiple audio content using beamforming based on the viewing window for the visual content includes modification of the multiple audio content based on difference between a rotation of the viewing window and rotational positions of the image capture device during the capture duration; and
the generation of the modified audio content from the multiple audio content includes rotation of audio channels around or about the image sensor axis of the image capture device.

19. The system of claim 17, wherein:
the viewing window for the visual content is determined further based on the rotational positions of the image capture device during the capture duration to provide a stabilized punchout of the visual content; and
the modified audio content is generated to match the stabilized punchout of the visual content.

20. The system of claim 17, wherein:
the viewing window for the visual content is determined further based on user selection of the viewing window to provide a user-defined punchout of the visual content; and
the modified audio content is generated to match the user-defined punchout of the visual content.

* * * * *